United States Patent [19]
Arnstein

[11] Patent Number: 6,047,023
[45] Date of Patent: Apr. 4, 2000

[54] SWEPT FREQUENCY MODULATION AND DEMODULATION TECHNIQUE

[75] Inventor: Donald Arnstein, Fairfax, Va.

[73] Assignee: Hughes Electronics Corporation, El Segundo, Calif.

[21] Appl. No.: 08/856,473

[22] Filed: May 14, 1997

[51] Int. Cl.[7] ............................. H03H 7/30; H03H 7/40; H03K 5/159; H04B 15/00

[52] U.S. Cl. ....................... 375/229; 375/204; 375/230; 375/232; 375/334; 375/340; 370/280; 370/294; 370/330; 370/337; 370/347; 370/436; 370/442; 370/458; 370/478; 370/498

[58] Field of Search ..................... 375/204, 229, 375/230, 231, 232, 233, 234, 235, 236, 334, 340; 370/280, 294, 337, 347, 330, 478, 436, 442, 458, 498; 331/106

[56] References Cited

U.S. PATENT DOCUMENTS

| | | | |
|---|---|---|---|
| 4,312,072 | 1/1982 | Vogel | 380/34 |
| 4,759,013 | 7/1988 | Ichiyoshi | 370/307 |
| 5,038,344 | 8/1991 | Kawamura | 370/307 |
| 5,282,225 | 1/1994 | Nikias et al. | 375/232 |
| 5,294,933 | 3/1994 | Lee et al. | 342/159 |
| 5,483,557 | 1/1996 | Webb | 375/349 |
| 5,524,124 | 6/1996 | Koenig | 375/229 |
| 5,748,670 | 5/1998 | Zastrow | 375/204 |
| 5,751,703 | 5/1998 | Kobayashi et al. | 370/321 |

OTHER PUBLICATIONS

Chelouche et al., "Digital Wireless Broadband Corporate and Private Networks: RNET Concepts and Applications," *IEEE Communications Magazine*, Jan. 1997, pp. 42–46, 51.

*Primary Examiner*—Stephen Chin
*Assistant Examiner*—Michael W. Maddox
*Attorney, Agent, or Firm*—Michael W. Sales; John T. Whelan

[57] ABSTRACT

A swept frequency communication system includes a modulator that multiplies a frequency sweep signal with one or more underlying modulated communication signals to produce a swept frequency signal having a number of headerless tracks located directly adjacent one another in the swept frequency/time domain. A demodulator receives the swept frequency signal after that signal has been passed through a wireless channel, isolates a particular track of the received swept frequency signal to prevent a near/far problem, A/D converts the isolated track, resweeps the digitized isolated track, and then equalizes the isolated track using a blind channel equalizer to eliminate time-varying amplitude/phase impairments caused by transmission of that track through the wireless channel. The demodulator then removes the sweep signal from the equalized swept frequency track and decodes or demodulates the underlying modulated communication signal.

30 Claims, 5 Drawing Sheets

FIG. 3
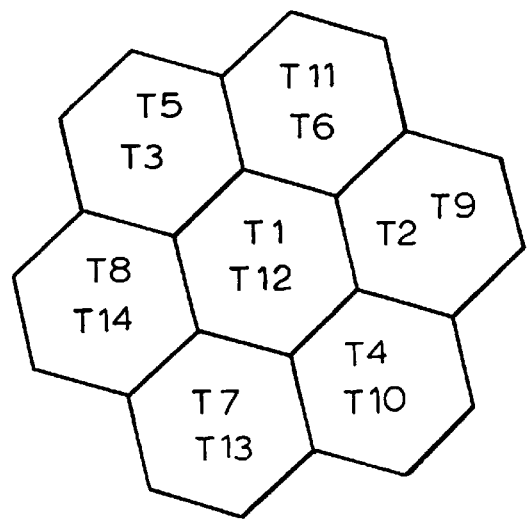
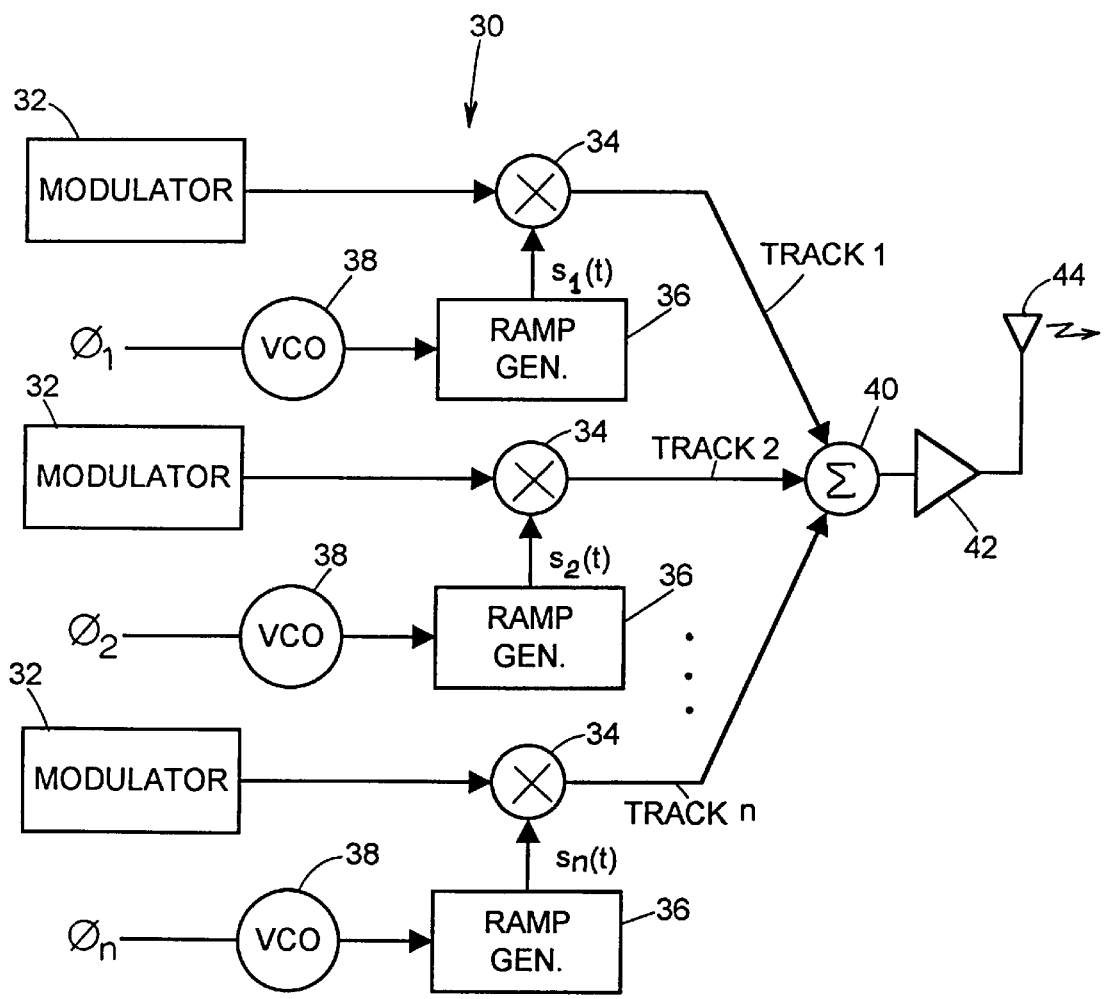
FIG. 4

SWEPT FREQUENCY MODULATION AND DEMODULATION TECHNIQUE

BACKGROUND OF THE INVENTION (a) Field of the Invention

The present invention relates generally to a communication signal modulation and demodulation technique and, more particularly, to a swept frequency modulation and demodulation technique using a channel equalizer.

(b) Description of Related Art

Communication systems and, particularly, mobile cellular communication systems such as telephone systems, typically use frequency division multiple access (FDMA) and/or time division multiple access (TDMA) techniques to establish a plurality of communication channels between a base station and a multiplicity of users, such as mobile units, located within a particular geographic region. As is well known, an FDMA technique multiplexes a signal into one of a number of different frequencies or frequency regions while a TDMA technique multiplexes a signal into one of a number of repeating time slots associated with a frequency band. To maximize the number of channels for an available frequency band, some mobile digital communication systems, such as digital telephony systems, combine FDMA and TDMA techniques to establish a multiplicity of channels, wherein each channel uses one of a number of repeating time slots at one of a number of different frequencies.

Beyond a few hundred meters, mobile cellular communication systems that operate in, for example, the 800 MHz to 900 MHz and the 1800 MHz to 2000 MHz frequency regions begin to undergo degradation caused by multipath. Multipath largely results from the presence of multiple reflectors scattered throughout a geographical region in which a communication signal is transmitted. These multiple reflectors cause the transmitted signal to take numerous, different-length paths between the transmitter and a receiver unit which, in turn, causes numerous phase and time delayed versions of the transmitted signal to reach the input of the receiver unit simultaneously. The over-all range of time delays is commonly called the delay-spread of the channel. In the presence of multipath, with no direct line of sight path, the receiver unit collects a signal having an amplitude with a Rayleigh distribution. As a result, in the absence of a direct path, the receiver unit experiences deep fading or signal nulls with a high degree of certainty. Generally such nulls may last for fractions of a second, seconds, or minutes depending upon the speed of the mobile terminal relative to the base station which, in turn, determines how fast the channel is changing.

In the past, fading has been reduced using energy dispersal techniques in the form of frequency diversity. Energy dispersal techniques, such as frequency hopping (FH), code division multiple access (CDMA), and other spread spectrum techniques spread the energy associated with a signal over a number of different frequencies to form a channel having an overall response that is a function of the response at each of the different frequencies (in both the amplitude and phase domains). In effect, an energy dispersal technique averages the amplitude and phase response at all of the frequencies being used to prevent a receiver unit from being limited to the response at only one of the frequencies and, thereby, to prevent the receiver unit from experiencing reduced effectiveness because it is located within an effective null at a particular frequency. However, some energy dispersal techniques such as slow or fast FH lose coherency from hop to hop which requires additional processing and increases the overhead associated with the transmission of a signal.

Regardless of the specific modulation technique chosen, it is always an objective in cellular wireless communications to accommodate many users at the same time. Therefore, whatever pattern of modulation one transmitter-receiver pair uses, it is necessary to accommodate a multitude of users, each one assigned to a specific modulation pattern. When the modulation patterns (e.g., the time-frequency tracks) for any two users do not ever overlap, the access technique is called orthogonal. FDMA and TDMA are examples of orthogonal modulation. It is possible, in some situations, to make spread spectrum signals orthogonal even though the time-frequency tracks overlap at some point. More commonly however, overlaps cannot be avoided in which case, the receiver contains what is known as self-noise.

The near/far problem is closely associated with self-noise in that it is also a characteristic of non-orthogonal spread spectrum techniques. As is generally known, a near/far problem arises when a receiver unit tries to receive and tune to a signal being transmitted by a transmitter located at a relatively "far" distance, but is incapable of doing so because the receiver tuning circuitry is overwhelmed or captured by a signal being transmitted by a transmitter located at a relatively "near" distance. In effect, the power of the "near" signal causes the receiver unit to be incapable of distinguishing or decoding the lower power "far" signal. The near/far problem necessitates the use of real time power control.

While, the previous discussion emphasizes the effect of multipath in the creation of a fade condition at one or more frequencies, multipath also creates a condition, due to delay-spread, where modulation symbols are smeared into one another. This condition is known as inter-symbol interference (ISI) and is a time-based phenomenon rather than a frequency-based phenomenon. By making modulation symbols much longer than any anticipated delay-spread, one can minimize ISI by confining it to a small region of time near the modulation symbol transitions. This procedure does not eliminate fading however. Thus, while it is a fairly simple matter to use energy dispersal to compensate for fading when the intersymbol time of a digital communication channel is much longer than the delay-spread, because of ISI, it is more difficult to compensate for fading using energy dispersal when the intersymbol time is reduced to be on the order of or to be lower than the delay-spread. Unfortunately, due to higher usage and throughput requirements, newer communication systems are being designed to have higher data rates and, therefore, shorter intersymbol times which, in turn, makes these systems more susceptible to ISI.

In the past, equalization techniques have been used to compensate for intersymbol interference. Generally, equalization techniques try to calculate or configure a series of tap weights associated with a tapped delay line or a digital filter, such as a Kalman filter, in a manner that best eliminates the effects of a channel on a received signal. Typical equalization techniques are discussed in Qureshi, "Adaptive Equalization," Proceedings of the IEEE (1985); Reprinted in, Rappaport ed., "Selected Readings in Cellular Radio and Personal Communications," IEEE ISBN 0-7803-2283-5© (1994), and may use an iterative or adaptive routine designed to calculate tap weights that minimize, for example, the mean squared error, between a known test sequence and the test sequence after that test sequence has been transmitted through a channel and equalized. However, these equalization or tap weight estimation routines usually require a lot of processing over a number of iterations, use filters with only a small number of tap weights (e.g. three), and always require that a known training or test signal be sent through the channel on a periodic basis.

Other methods of reducing fading and/or intersymbol interference include the use of forward error correction (FEC) coding, directive antennas, and M-ary modulation techniques. While FEC coding can correct a certain number of transmission bit errors, FEC coding increases the transmitted bit rate which may further increase the intersymbol interference and/or cause longer decoding delays. Likewise, although directive antennas decrease fading by assuring that less multipath is received, directive antennas are not always possible or easy to employ in cellular communication systems, such as mobile telephone systems, because directional antennas are physically much larger structures than omni-directional antennas, and to be useful, one must know the direction to point them. Also, while M-ary modulation techniques are able to increase the symbol length and, therefore, decrease intersymbol interference without decreasing throughput, M-ary techniques require an increase in transmitted power and are more susceptible to noise within the channel.

It is desirable, therefore, to provide a coherent frequency modulation technique that allows a high symbol transmission rate while avoiding fading and intersymbol interference. One relatively coherent energy dispersal method discussed in Humblet et al., "A Multiaccess Protocol for High-Speed WLAN," VTC '96, Atlanta, Ga. (April 1996), and Chelouche et al., "Digital Wireless Broadband Corporate and Private Networks: RNET Concepts and Applications," IEEE Communications Magazine, pp. 42–51 (January 1997) applies a frequency-ramped sweep signal to a modulated communication signal to produce one of a number of track signals which is then transmitted through a wireless channel. A receiver unit associated with this system receives the track signal, removes the swept frequency modulation from the received track signal and then demodulates the communication signal using standard techniques.

While the swept frequency modulation technique discussed in these articles provides generally coherent energy dispersal, this system still has a number of problems. For example, although this system sends multiple swept frequency signals or tracks over a wireless channel in a simultaneous manner, each of the tracks includes a single, fixed-frequency header having synchronization or other information pertaining to the track therein. Because the non-swept header must be sent through the channel for a discrete amount of time, the number of tracks that can be simultaneously multiplexed within the system is limited by both the time width of the fixed-frequency headers and the frequency width of the swept frequency portions of the tracks. In most cases, due to the length of the headers, the swept frequency tracks of this system cannot be placed directly adjacent one another in the swept frequency/time domain and, therefore, this system does not use all of the available frequency/time space associated with the particular frequency range over which a communication signal is being swept. Also, in this system, there is a discrete frequency jump between the end of the header and the start of the ramped frequency portion of the track which complicates the demodulation of these signals because a demodulator must track phase jumps and/or must demodulate the fixed-frequency header and the ramped frequency portion of each track independently.

Furthermore, using the swept frequency modulation scheme disclosed in these articles introduces a rapid change in the amplitude and phase of the received signal which mimics the transfer function of the multipath channel, H(jw). It is just this amplitude variation that provides the desired anti-fading property of this type of signal. However, if not compensated for, the amplitude and phase variations make the signal difficult to demodulate using a conventional receiver. In particular, the swept frequency signal picks up amplitude gains and phase shifts across an entire band of frequencies, not just one. If not removed, these time-varying impairments degrade or prevent detection and demodulation of the underlying modulated communication signal because a conventional demodulator will have a problem automatic gain controlling (AGC) and phase locking the received signal within the very short period of time that the demodulator receives the transmitted signal, i.e., the sweep frame or sweep interval associated with each track. The above-identified articles fail to recognize or address this problem but, instead, merely assume that the frequency sweep component of a swept frequency signal can be totally compensated using a downconversion signal also containing the linear sweep.

SUMMARY OF THE INVENTION

The present invention relates to a communication system that uses a linear swept frequency modulation technique to provide frequency diversity within a transmitted communication signal so as to reduce or eliminate fading. According to one aspect of the present invention, a modulator multiples one or more frequency-ramped sweep signals with one or more underlying modulated communication signals to produce a swept frequency signal having one or more header-less tracks therein and then transmits the swept frequency signal through a wireless channel. Preferably, the headerless tracks of the swept frequency signal are located directly adjacent to one another in the swept frequency/time domain to increase the number of channels associated with the communication system.

According to another aspect of the present invention, a demodulator receives a transmitted swept frequency signal, isolates a particular track of the swept frequency signal to prevent a near/far problem and then equalizes the isolated track, or a portion thereof, using a channel equalizer that combines the isolated track with an equalizing signal preferably comprising the complex conjugate of the channel transfer function. Such a channel equalizer, which may be a convolver or a digital delay line, simultaneously reduces the intersymbol interference and compensates for the rapid amplitude/phase impairments introduced into the swept frequency signal by the wireless channel. Thereafter, the demodulator removes the sweep signal from the equalized swept frequency signal and decodes or demodulates the underlying modulated communication signal.

Preferably, the channel equalizer develops the equalizing signal directly from the received swept frequency signal and, thus, comprises a blind equalizer. As commonly used, a blind equalizer refers to a technique that does not require a training sequence. Such a blind equalizer may be digitally implemented by a processor that multiplies the received swept frequency signal with a frequency-ramped sweep signal to produce a determined frequency signal, removes the modulation from the determined frequency signal to produce an estimate of the transfer function for the channel, and then develops the equalizing signal from the channel transfer function estimate by, for example, calculating the complex conjugate of the channel transfer function estimate. When the underlying modulation technique is a binary phase shifted digital technique, the processor may remove the underlying modulation by raising the determined frequency signal to a power of two to produce a raised signal, filtering the raised signal using, for example, a low pass filter, and then taking a complex root (such as a square root) to produce the channel transfer function estimate. In such a case, the processor must transform the filtered raised signal into a continuous phase signal, i.e., one having a continuous phase component, before taking a root of that signal. Alternatively, the channel equalizer may develop an equalizing signal in any other desired manner including, for example, using an unmodulated test or training signal periodically sent by a transmitter through the wireless channel.

As will be understood, the swept frequency signal of the present invention has the effect of inducing motion by forcing the channel response to change at the sweep rate, which is much faster than the motion of a user terminal relative to the multipath structure that causes fading. Also, average receive signal power levels and receive noise power spectral densities are not affected by using swept frequency modulation. As a result, there is no need to redesign or add increased power hardware to an existing modulator. Still further, the swept frequency modulation technique according to the present invention can be applied as an overlay to existing modulation techniques and, therefore, can be applied by merely adding hardware to existing communication systems without having to redesign the entire communication system. Also, because individual tracks of the swept frequency modulation technique of the present invention do not have fixed-frequency header information added thereto, the communication system of the present invention can provide more swept frequency tracks within a particular frequency region than swept frequency modulation systems that use frequency tracks having a fixed-frequency header.

BRIEF DESCRIPTION OF THE DRAWINGS

FIG. 3 comprises a geographic chart illustrating a cluster of seven geographic cells having different swept frequency tracks assigned thereto;

FIG. 4 comprises a block diagram of a base transmitter that transmits a number of different swept frequency tracks according to the present invention;

DESCRIPTION OF THE PREFERRED EMBODIMENTS

By the way of example only, the swept frequency modulation and demodulation technique according to the present invention is described herein as being used in a telecommunication system, such as a mobile cellular telephone system, to receive and transmit microwave/millimeter wave communication signals and, particularly, those in the 800–900 MHz and 1800–2000 MHz ranges. It should be understood, however, that the modulation and demodulation techniques described herein can also or alternatively be used in other communication systems including, for example, any desired satellite or ground-based, audio, video, data, audio-visual, etc. signal distribution system or communication system, including those which use any other wavelengths. Generally, however, the modulation and demodulation techniques described herein are best suited for use in communication systems that cannot guarantee direct line of sight transmission capabilities and, therefore are best used in systems that transmit at less than 5 GHz.

Generally, the present invention disperses the energy of a communication signal modulated according to any desired analog or digital modulation technique including, for example, AM, FM, BPSK, QPSK, M-ary, etc. modulation techniques, by applying a sweep signal and, more particularly, a linear, ramped-frequency sweep signal, to the modulated communication signal before transmitting that signal through a communication channel which may comprise, for example, a wireless communication channel. At a receiver unit, a demodulator isolates the swept frequency modulated communication signal, applies a channel equalizer to the received isolated signal to compensate for the time-varying amplitude/phase impairments resulting from transmission of the swept frequency signal through the channel and to eliminate intersymbol interference, and then removes the sweep signal from the equalized signal to produce the modulated communication signal. Thereafter, the modulated communication signal may be demodulated using an appropriate analog or digital demodulation technique to develop the communication signal.

Figure 1:
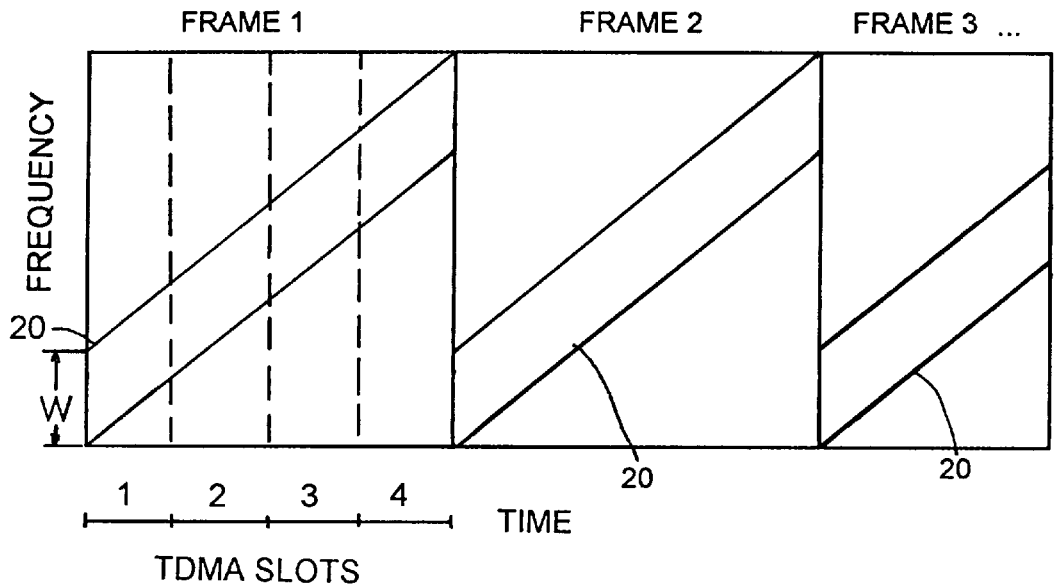
FIG. 1 comprises a frequency/time domain plot illustrating multiple frames of a headerless linear swept frequency track according to the present invention.

FIG. 1 illustrates a single linear-ramped, swept frequency signal or track 20 developed according to the present invention. The swept frequency track 20 begins at a lower frequency and increases in frequency over time to an upper frequency at which time the track begins again at the lower frequency. As can be seen in FIG. 1, the track 20 sweeps through both the frequency and the time domain in a linear manner to produce a saw-tooth type signal. While the track 20 is illustrated as sloping up through frequency over time, it could, just as well, slope down through frequency over time.

As noted above, the track 20 includes a communication signal modulated according to some other modulation technique, such as QPSK, and, as a result, takes up a finite frequency band or width (w) within the frequency domain. The swept frequency track 20 may be time division multiplexed to enable different receiver units to receive and/or transmit communication signals within different time slots of the track 20. Although four TDMA slots are illustrated in FIG. 1, any other desired number of TDMA slots could be used instead. Also, while the track 20 preferably sweeps through a frequency band of between about 0.5 MHz and about 5.0 MHz at RF frequencies in the 800 to 2000 MHz range, the track 20 may sweep over any other desired continuous frequency band at any desired slope of non-zero magnitude. of course, the slope and the swept frequency band of the frequency sweep will be dependent on the characteristics of the particular system in which the swept frequency modulation is used. Generally speaking however, the higher the transmission data rate, the greater the swept frequency band needs to be while the higher the delay spread of the multipath channel (i.e., the more multipath), the less the swept frequency band needs to be. Similarly, while the frame time or sweep period will be dependent on the configuration of the system being used, frame times on the order of ten microseconds to a couple of milliseconds are deemed appropriate.

Figure 2:
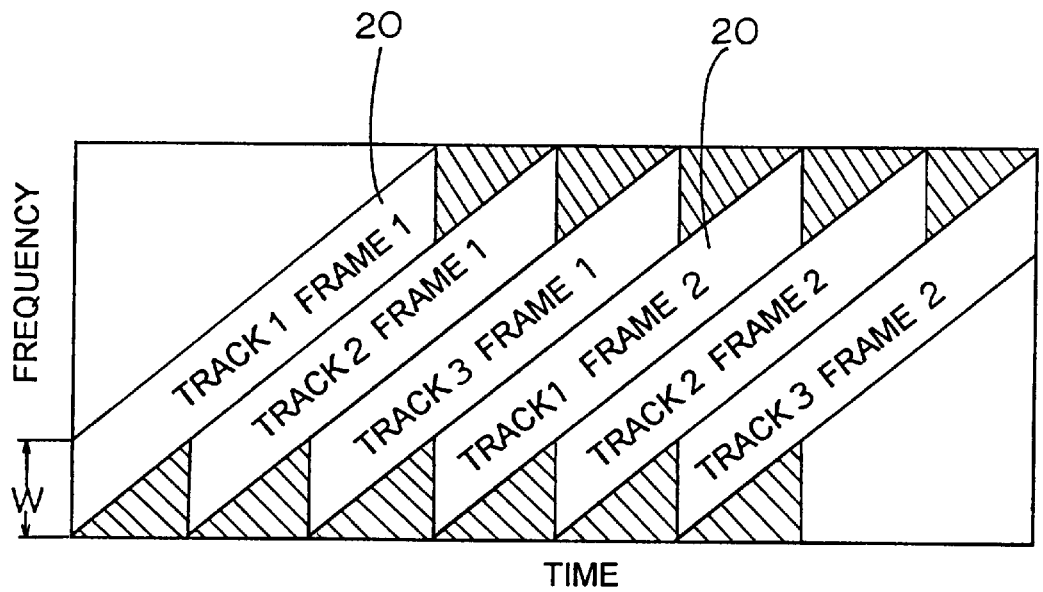
FIG. 2 comprises a frequency/time domain plot illustrating two frames of three headerless swept frequency tracks placed adjacent to one another according to the present invention.

Referring now to FIG. 2, any number of tracks (e.g., tracks 1, 2, and 3) can be placed immediately adjacent to one another in the frequency/time domain to use all of the available frequency/time space associated with a particular band of frequencies. As can be seen in FIG. 2, each of the tracks therein is simultaneously available to a receiver unit and each may include any desired number of TDMA slots to increase the number of channels associated with the communication system. Of course, more or less than three tracks can be placed side by side with respect to one another in the linear swept modulation technique illustrated in FIG. 2. Furthermore, the tracks do not have to start over immediately when the highest frequency in the sweep is reached. Instead, there can be a discrete amount of time between the time when a track reaches the highest sweep frequency and the time when that track starts over at the lowest sweep frequency.

The linear swept frequency modulation technique illustrated in FIGS. 1 and 2, provides frequency coherent energy dispersal and, therefore, reduces fading, without introducing self-noise, as do other spread spectrum techniques. Moreover, because the individual swept frequency tracks (illustrated in FIG. 2) do not include headers associated therewith but, instead, sweep constantly, these tracks may be placed directly adjacent to one another without skipping frequency/time space therebetween which, in turn, enables the maximum number of tracks to be placed within any particular frequency band. In fact, the modulation technique illustrated in FIGS. 1 and 2 provides as many separate tracks as those available using a standard FDMA technique except that a small amount of the time-frequency space, shown as the cross-hatched areas in FIG. 2, is not usable.

FIG. 3 illustrates a geographic diversity scheme which may be used by, for example, a cellular communication system when implementing the modulation scheme described above. As illustrated in FIG. 3, different tracks are used within or are assigned to different cells of a geographic cluster and, preferably, the tracks are assigned so that no two adjacent cells use the same track. Thus, for example, tracks 1 and 12 of a 14 track system may be used within a center cell of a cluster while the cells surrounding the center cell use tracks 3 and 5, tracks 6 and 11, tracks 2 and 9, tracks 4 and 10, tracks 7 and 13, and tracks 8 and 14. Of course the geographically diverse track pattern of the cluster of FIG. 3 may be repeated to add more cells. Likewise other track assignments can be used so long as adjacent cells use different tracks to prevent cell-to-cell interference. Still further, two-way communication between a base station and number of receiver units may be established using a frequency division duplexing (FDD) scheme, in which the base station transmits one or more tracks at a first frequency band and the receiver units transmit tracks at a second and different frequency band, or a time division duplexing (TDD) scheme, in which the base station and the receiver units transmit at the same frequency band but at different scheduled times.

FIG. 4 illustrates a modulator 30 that implements the swept frequency modulation technique of the present invention. The modulator 30, which may be located at, for example, a cellular telephone base station, includes any number (n) of channels, each of which develops a different swept frequency track. As illustrated in FIG. 4, each of the n channels includes a standard modulator 32, such as a BPSK, QPSK, M-ary, etc. modulator, that operates to modulate a communication signal in any known or desired manner. The modulator 32 of each channel may interleave or time division multiplex different communication signals together in any standard manner before or after modulating those signals and may provide FEC and/or other types of coding to one or more communication signals, all as known in the art.

The modulated communication signal developed by the modulator 32, which would normally be upconverted and sent directly over a wireless channel to a mobile unit or other receiver unit in an FDMA system, is provided to a multiplier 34 that multiplies the modulated communication signal by a sweep signal $s_n(t)$ developed by a ramp generator 36. The ramp generator 36 is controlled by a voltage controlled oscillator (VCO) 38 to produce the sweep signal $s_n(t)$ which, preferably, ramps in a continuous linear manner between first and second RF (i.e., transmission) frequencies. The sweep signal $s_n(t)$ may be, for example, a saw-tooth or a triangular frequency waveform, generally of the form:

$$s_n(t)=e^{j(2\pi m\frac{1}{2}t^2+\phi_n)} \qquad (1)$$

wherein:

$s_n(t)$=the sweep signal of the nth channel;

t=the time;

m=the slope of linear frequency ramp; and $\phi_n$=the phase offset of the sweep signal of the nth channel.

The output of the multiplier 34 comprises a swept frequency signal or track, such as one of the tracks illustrated in FIGS. 1 and 2, having a modulated or otherwise coded communication signal modulated with an RF frequency-ramped signal. of course, it is understood that the multiplier 34 includes appropriate filtering circuitry. The swept frequency track produced by the multiplier 34 is provided to a summer 40 that combines the upconverted swept frequency tracks from each of the channels of the modulator 30 to form a single swept frequency signal having n swept frequency tracks associated therewith. Preferably, the modulator 30 includes a controller (not shown) that controls the timing or phase of the VCOs 38 and/or the ramp generators 36 in each of the channels to assure that the sweep signals $s_1(t)$, $s_2(t)$, etc. produced by those channels are out of phase with respect to each other by an amount necessary to place those track signals directly adjacent to one another in the frequency/time domain. However, the track signals may also be interleaved so that some unused frequency/time space is provided between the track signals, if so desired.

A wideband amplifier 42 amplifies the multiple swept frequency signals developed by the summer 40 and an antenna 44 transmits the amplified swept frequency signals to one or more receiver units such as mobile units located in, for example, a cell of a cellular telephone network.

Figure 5:
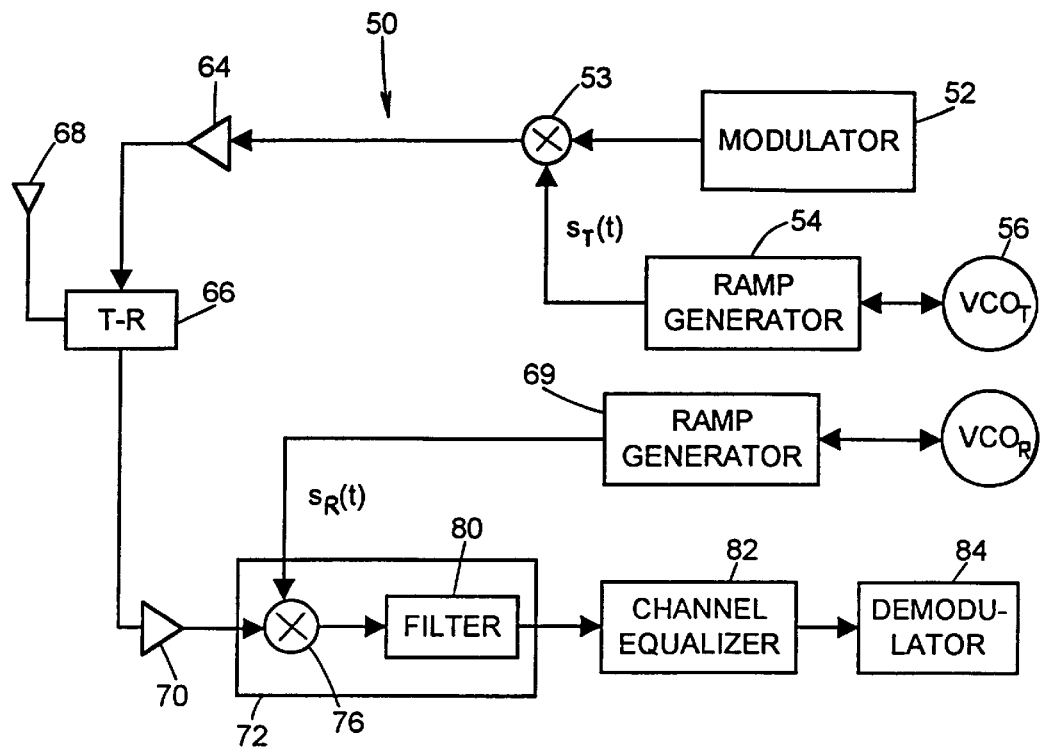
FIG. 5 comprises a block diagram of a mobile modulator/demodulator unit according to the present invention.

Referring now to FIG. 5, a receiver unit such as a mobile unit 50 having receive/transmit capabilities is illustrated. While the mobile unit 50 of FIG. 5 uses an FDD two-way communication scheme, it could, instead, be designed to use a TDD two-way communication scheme. The mobile unit 50 includes a modulator 52 that operates to modulate, for example, a digital communication signal in any known or desired manner including, for example, using 0° or 180° BPSK, QPSK, etc. modulation to produce a modulated communication signal at IF. The output of the modulator 52 is provided to a multiplier 53 which also receives an upconverting sweep signal $s_T(t)$ that sweeps through an RF transmission frequency band. The sweep signal $s_T(t)$ is produced by a ramp generator 54 controlled by a VCO 56

(VCO$_T$) in the manner discussed with respect to the same elements illustrated in FIG. 4. The multiplier 53 multiplies the upconverting sweep signal s$_T$(t) by the modulated communication signal produced by the modulator 52 to produce a swept frequency track signal (or a portion thereof) at RF to be transmitted to, for example, a base station. A wideband amplifier 64 then amplifies the up-converted swept frequency signal and provides this amplified signal through an transmit/receive diplexer 66 to an antenna 68 which, in turn, transmits the amplified signal to a receiver associated with, for example, a base station, a satellite, another mobile unit, etc. Of course, the phase of the VCO 56, the phase of sweep signal s$_T$(t), and the timing of the transmit/receive diplexer 66 are controlled by a controller (not shown) using any desired timing method to assure that the signal produced by the modulator 52 is transmitted within a proper TDMA slot of a proper swept frequency track associated with the communication system.

Of course, when the mobile unit 50 (or any other unit) is initially turned on or enters a new cell, it must sync up to one of the track signals being sent by the base station within that cell to decode information sent by the base station and to assure that the signals the mobile unit 50 transmits are timed to be within a proper track. The mobile unit 50 may use both coarse and fine sync circuitry to properly align to a base station track. In particular, the mobile unit 50 may use a bandpass filter (not shown) centered around the center frequency of the RF frequency band transmitted by the base station to detect when a track signal being sent by the base station passes through that frequency. This detection provides a coarse timing signal which can be used by fine detection circuitry including, for example, a VCO controlled ramp signal generator 69 coupled within a power measurement feedback loop (not shown). The feedback loop may estimate the start time (phase) of the ramp signal generator 69 based on the course timing signal, cause the ramp signal generator 69 to produce a frequency swept signal starting at that start time, use the swept frequency signal to tune to the incoming track signal and measure the power received using that tuning arrangement. Thereafter, the feedback loop may control the phase of the VCO (VCO$_R$ in FIG. 5) to advance or retard the ramp signal in small increments, determine if more or less power is received using the advanced or retarded ramp signal as a tuning signal, and repeat this process until the highest amount of power is detected, at which time the ramp signal out of the ramp signal generator 69 is in sync with the incoming track signal. Thereafter, the mobile unit 50 can decode the incoming track signal using the technique described below to receive standard timing and other system information and use this information in any manner generally known in the art to control the timing and operation of two-way communication. Thus, for example, the mobile unit 50 may acquire a TDMA slot of the track 20 and reserve that slot/track until the mobile unit 50 signs off. The sync circuitry described above allows the communication system to use frequency tracks that do not include fixed-frequency headers and, as noted above, enables the frequency tracks to be located directly adjacent one another in the swept frequency/time domain. Of course, other standard detection and timing circuitry may also be used.

During receive mode, multiple swept frequency track signals arrive simultaneously at the antenna 68 and are provided through the transmit/receive diplexer 66 to a wideband amplifier 70. The amplifier 70 amplifies the multiple received track signals across the entire RF sweep frequency range associated with the communication system and provides the multiple track signals to a track isolator 72.

The track isolator 72 includes a multiplier 76 that multiplies the incoming signal by a sweep signal s$_R$(t) which, preferably, is the same sweep signal used by the base station transmitter to modulate the signal in the first place (equation 1) but having a phase determined according to the sync circuitry described above. Thus, as will be understood, the sweep signal s$_R$(t) is at the RF band associated with the RF band transmitted by the base station.

The multiplier 76 removes the frequency sweep from the received swept frequency tracks and, simultaneously, down-converts these tracks to baseband to produce a set of fixed-frequency tracks, each of which corresponds to one of the received swept frequency tracks. A filter 80, which may comprise a band-pass filter, isolates one of the fixed-frequency tracks by filtering out all of the fixed-frequency tracks except the track to which the mobile unit 50 is tuned. In this manner, the track isolator 72 isolates a particular track before converting that track into a digital signal which, in turn, prevents or eliminates any near/far problem that might otherwise occur.

While the filter 80 produces a track signal having the frequency sweep component removed, this signal is not equivalent to the modulated communication signal to which a sweep signal was applied in the transmitter due to the time-varying amplitude/phase impairments introduced into the swept frequency signal as it passed through the wireless channel. As is generally known, the most common reason for using a fixed-frequency, sinusoidal modulation signal (such as a typical FDMA signal) is that, when such a signal is input to a linear circuit (like a wireless channel), the output of that linear circuit is also a fixed-frequency sinusoidal signal having a single unknown gain and a single unknown phase change. However, this phenomenon does not hold in general for a swept frequency signal. In fact, passing a swept frequency signal through a wireless channel does not necessarily produce an identical swept frequency signal output unless the channel has, for example, an all-pass or flat characteristic. To assure that the channel amplitude and phase impairments are properly compensated (i.e., that the channel is broadband equalized), a channel equalizer 82 applies a channel equalizing filter to the signal developed by the track isolator 72.

Preferably, the equalizing filter is the complex conjugate of the channel transfer function H(jw) determined over the sweep (or TDMA slot) bandwidth. More particularly, the equaling filter may be expressed as:

$$\hat{H}*(jw) = \left|\hat{H}(jw)\right| e^{-\sphericalangle \hat{H}(jw)} \qquad (2)$$

wherein:

$\hat{H}*(jw)$=the estimated complex conjugate of channel transfer function; and $\hat{H}(jw)$=the estimated channel transfer function.

In effect, the equalizing filter of equation (2) compensates for the amplitude/phase impairment caused by the wireless channel by running the isolated track signal (which has already passed through the channel) through a circuit having a transfer function that is the complex conjugate of the channel transfer function to thereby compensate for the effects of the channel. The form of equalizing filter used above, namely the complex conjugate of an estimate $\hat{H}$(jw) of the true channel transfer function H(jw), is called a RAKE receiver in the literature (Price and Green, "A Communication Technique for Multipath Channels," Proc. of the IRE, Vol. 46, pp. 555–570 (March 1958)). After applying such an equalizing filter, the channel equalizer 82 then removes the sweep signal or frequency sweep portion from the equalized signal.

The output of the channel equalizer 82, which corresponds to the originally modulated communication signal, is then provided to a standard demodulator 84 where it is demodulated and decoded to produce the unmodulated communication signal. Of course, the modulated communication signal may have any sort of error coding, including FEC, interleaving, etc. therein and can be demodulated using any desired digital or analog technique.

Figure 6:
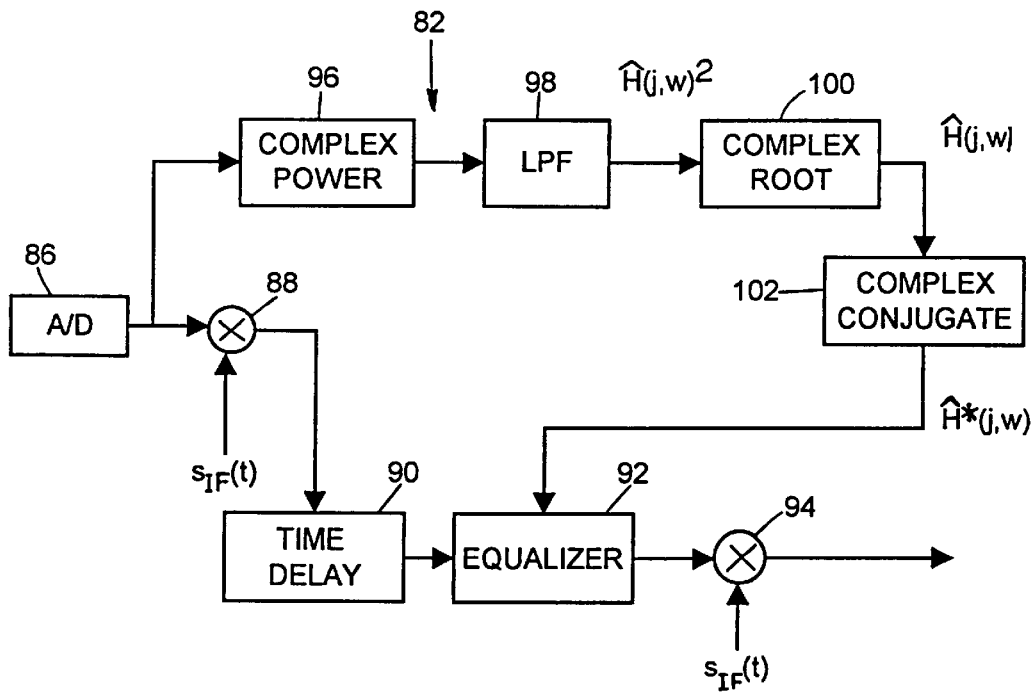
FIG. 6 comprises a block diagram of a channel equalizer of FIG. 5.

Referring now to FIG. 6, the channel equalizer 82 of FIG. 5 is illustrated in more detail. The channel equalizer 82 includes an A/D converter 86 that converts the analog isolated track signal produced by the filter 80 into a digital signal. As noted above, the A/D converter 86 will not be subject to a near/far problem because the track isolator 72 assures that only one track is present at the input of the A/D converter 86.

A digital multiplier 88 then multiplies the digital signal by a digital IF sweep signal $s_{IF}(t)$ to add the swept frequency modulation back to the isolated fixed-frequency track signal so that the channel equalizer 82 equalizes the signal actually passed through the wireless channel as opposed to a signal generally having the swept frequency modulation removed therefrom. Re-insertion of the sweep is necessitated by the track insolation operation which removes the sweep for purposes of filtering prior to A/D conversion. If the operation of the multiplier 88 was not performed, the system would not work because the equalizer 92 expects a sweep signal, not a constant frequency signal. Of course the digital sweep signal $s_{IF}(t)$ may be derived from the sweep signal $s_R(t)$ or, alternatively, the digital sweep signal $s_{IF}(t)$ may be stored in a digital memory and recalled at an appropriate time.

The output of the multiplier 88 is provided to a delay circuit 90 where the swept frequency track is delayed for a predetermined amount of time. The delay circuit 90, which may comprise a memory or any other desired type of digital delay circuit, provides a delayed, isolated, swept frequency track to an equalizer 92 which may comprise, for example, a convolving circuit such as a tapped delay line or a digital filter that convolves the delayed signal with the equalizing signal. As noted above, the equalizing signal preferably comprises the complex conjugate of the transfer function of the channel but may, instead, comprise the inverse of the channel transfer function or some other equalizing signal. An equalizer that is the inverse of the channel transfer function estimate $$\left[\frac{1}{\hat{H}(jw)}\right]$$

minimizes the ISI but is not optimum in the presence of noise. An equalizer that is the complex conjugate of the channel transfer function estimate [$\hat{H}^*(jw)$], known as a RAKE receiver, is optimum in the presence of noise. The equalizer 92 produces an equalized swept frequency signal (having amplitude/phase impairments caused by transmission through the channel compensated therefrom) and provides this signal to a multiplier 94. The multiplier 94 multiplies the equalized swept frequency signal with a sweep signal $s_{IF}(t)$, to remove the IF sweep frequency from the equalized signal and, thereby, to produce the modulated communication signal. The output of the multiplier 94 is then provided to the demodulator 84 of FIG. 5. Of course, the multipliers 88 and 94 apply appropriate filtering to the signals produced thereby.

Although it is fairly easy to equalize the received and isolated swept frequency signal with the complex conjugate of the channel transfer function when the channel transfer function is known, the channel transfer function for a wireless channel is not usually known beforehand and, in almost all wireless communication systems, the channel transfer function is constantly changing. It is, therefore, necessary to determine or estimate the transfer function of the channel before any equalization can be performed.

Preferably the channel equalizer 82 is a blind equalizer in that it computes or determines the equalizing signal without requiring a test or training sequence to be sent through the channel but, instead, determines the equalizing signal from a received signal having communication data modulated thereon. To estimate the channel transfer function in a blind manner, the channel equalizer 82 may remove the swept frequency modulation and the underlying modulation associated with the communication signal from the received swept frequency signal and use the remaining signal as an estimate of the channel transfer function. Of course the swept frequency modulation can generally be removed by multiplying the received swept frequency signal by the sweep signal used to modulate that signal, i.e., $s_R(t)$ and of course, filtering the output of the multiplier appropriately. This function is performed by the multiplier 76 of the track isolator 72. Furthermore, when the underlying communication signal is modulated with a digital binary phase shift modulation technique, the underlying modulation can be removed by first squaring the signal across the sweep period associated with a frame or a TDMA slot of the track signal being decoded, filtering the squared signal, and then taking the square root of the filtered signal.

To calculate the channel transfer function in this manner, a block 96 first determines a complex power of the digital, fixed-frequency signal developed by the A/D converter 86 to remove the digital phase modulation applied to that signal. Generally, to remove the digital modulation associated within any M-state digital phase modulation technique (where M is greater than or equal to two), the block 96 calculates the Mth complex power of the fixed-frequency signal produced by the A/D converter 86 over the sweep period (or a TDMA slot). Thus, for example, to remove the digital modulation associated with a two state digital modulation technique, such as a BPSK modulation technique, the block 96 squares the signal produced by the A/D converter. Alternatively, to remove the digital modulation associated with, for example, a QPSK modulation technique (wherein M equals 4), an 8-QAM modulation technique (wherein M equals 8), etc., the block 96 computes the 4th, 8th, etc. power, respectively, of the digital signal produced by the A/D converter 86. In this manner, the block 96 produces an estimate of the channel transfer function raised to the Mth power plus some high frequency noise generated by interaction of the modulated signal with the multipath channel.

A digital low pass filter 98 removes the high frequency noise from the squared or otherwise raised signal developed by the block 96 to thereby produce an estimate of the channel transfer function raised to the Mth power. If desired, the low-pass filter 98 may comprise a discrete Fourier transform (DFT) that converts a sweep period (or a TDMA time slot) of the raised signal to the frequency domain, a digital low pass filter that filters out the high frequency components, and a reverse DFT that transforms the filtered signal back to the time domain.

Thereafter, a block 100 takes the Mth complex root of the signal developed by the filter 98 to produce an estimate of the channel transfer function, $\hat{H}(jw)$. Next, a block 102 determines the complex conjugate of the channel transfer function estimate $\hat{H}^*(jw)$ in any known or desired manner and provides the $\hat{H}*(jw)$ signal to the equalizer 92 for use as the equalizing signal. As noted above, the equalizer 92 may be a digital filter or a tapped delay line that uses the equalizing signal as the tap weights thereof. Alternatively, the equalizer 92 may simply convolve the digital swept frequency modulated communication signal with the equalizing signal.

Figure 7:
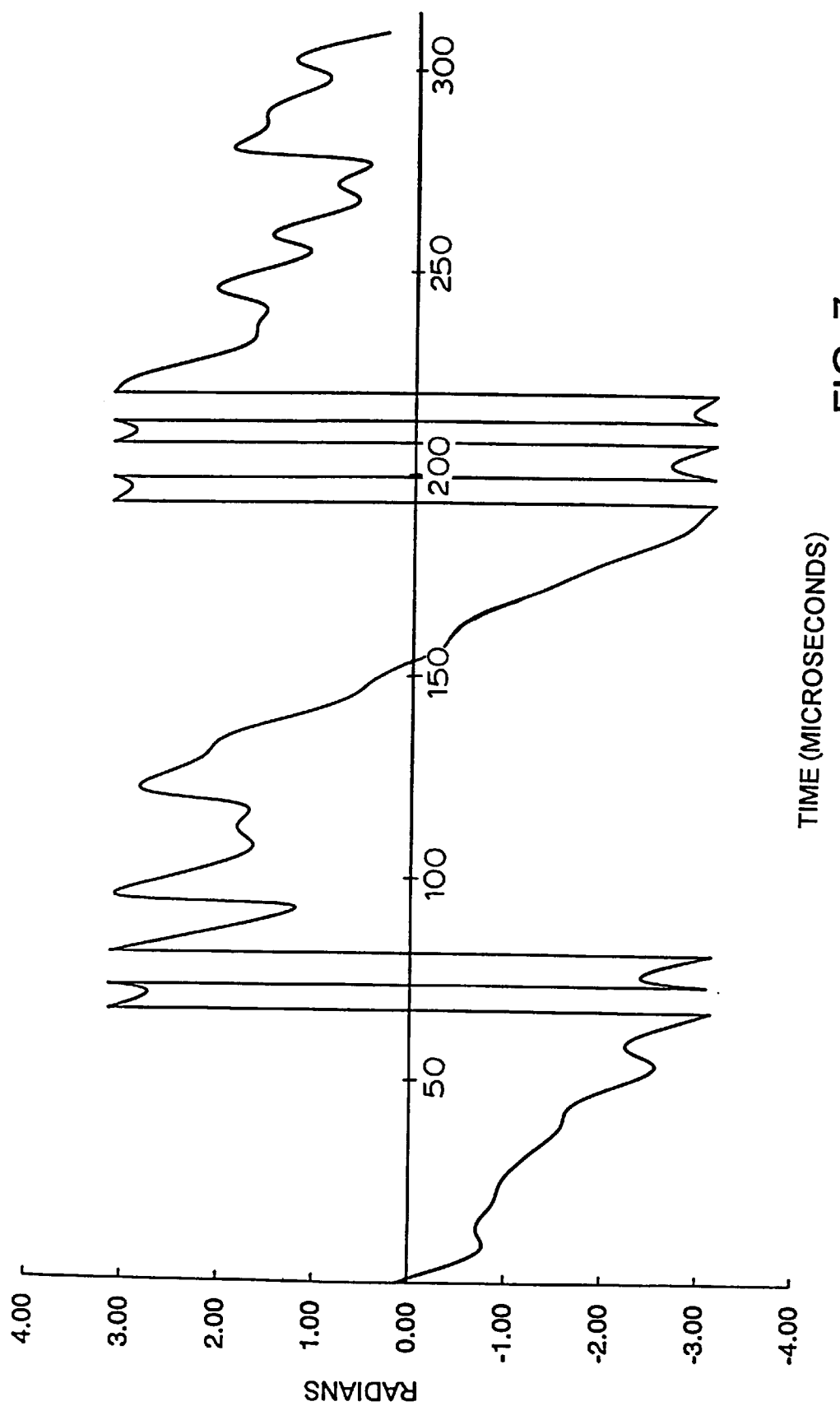
FIG. 7 comprises a phase chart illustrating the phase of a squared signal produced by the channel equalizer of FIG. 5 having phase jumps therein.

The block 96 may take a complex power (such as a square) and the block 100 may take a complex root (such as a square root) of the signal in any desired or known manner using any analog or digital technique. However, it should be noted that the block 100 must assure that the signal provided to the input thereof has a continuous phase component before taking the complex root of that signal. Otherwise, the output of the block 100 will not be a continuous function and will not be an accurate estimate of the channel transfer function. Unfortunately, when the block 96 computes a complex power of the signal developed by the A/D converter 86 and, particularly, when the block 96 computes this complex power digitally, the phase component of the raised (e.g. squared) signal, when represented numerically, may have jumps or discontinuities therein caused by the digital squaring routine keeping the phase of the squared signal to a numerical value between plus and minus pi radians. FIG. 7 illustrates a phase plot of a typical squared signal having jumps therein caused by a digital squaring routine. In particular, there are phase jumps equal to two pi at, for example, about 70, 75, 80, 190, 200, etc. microseconds, in the phase plot of FIG. 7 caused by representation of the phase as a unique number.

Note that when the signal is represented as a vector in two dimensional space (real and imaginary space), the signal's position on the plane which is, in this representation, both an amplitude and an angle of the vector relative to the real axis, doesn't actually jump. Instead, the vector merely passes smoothly through a line (the negative real axis) for which the numerical designation of phase becomes multivalued. It is only when one wants to find a root of the vector (say a square root) that the multivalued nature of phase becomes a problem.

Figure 8:
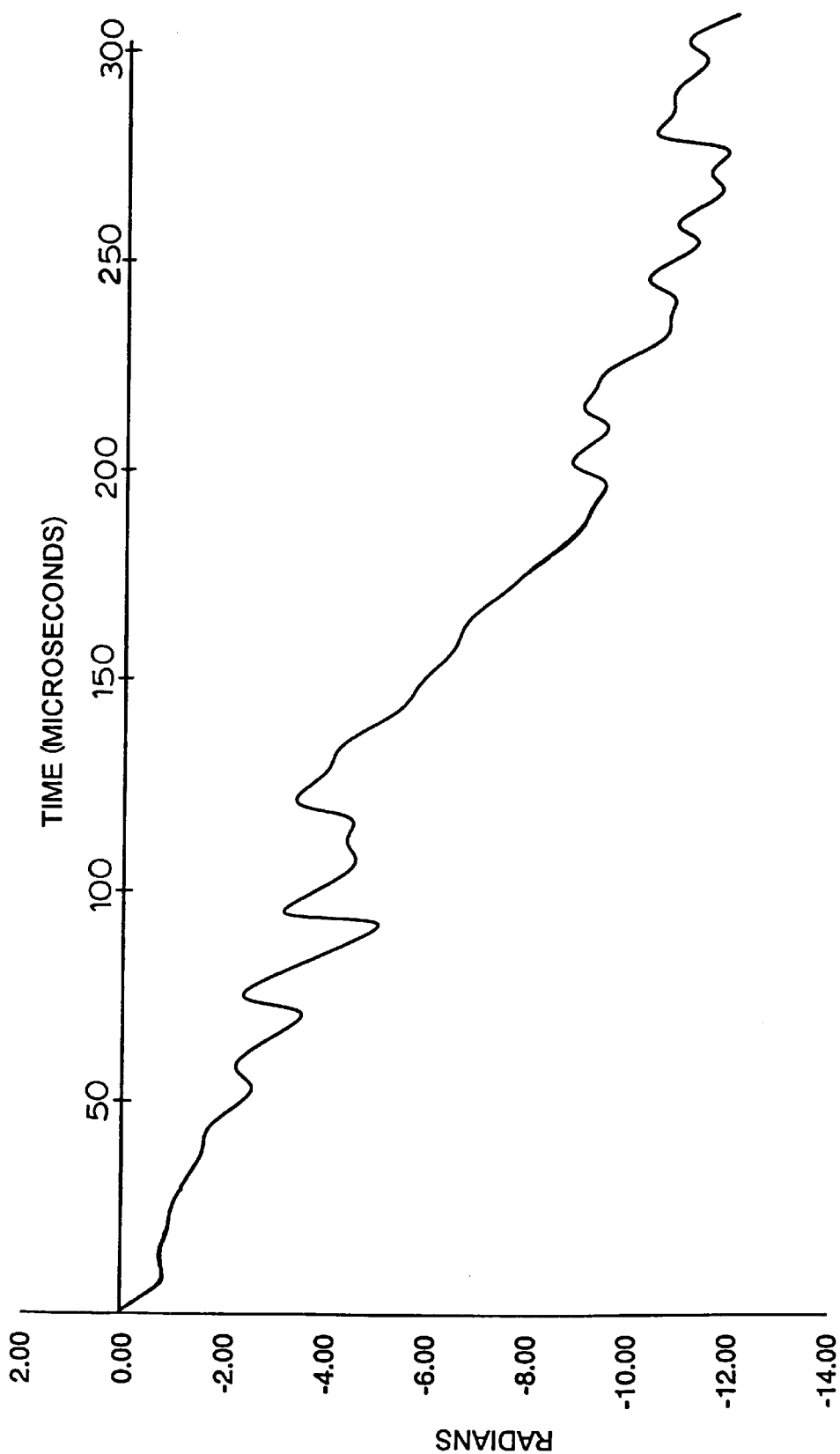
FIG. 8 comprises a phase chart illustrating the phase of the signal of FIG. 7 after the phase jumps have been removed.

To get a meaningful root of the signal of FIG. 7, it is necessary to unwrap the phase plot to eliminate the phase jumps (which are really only an artifact of the digital squaring routine). To eliminate these phase jumps, the block 100 starts at the zero time data point and scrolls through the numerical data points to recognize a phase jump greater than or equal to $2\pi$ radians. When such a jump is detected, the block 100 adds or subtracts $2\pi$ radians to the data following the jump until another jump is detected. At this point, depending on the direction of the jumps, a different multiple of $2\pi$ radians (for example $4\pi$ radians or zero) is added or subtracted to the data until the next jump is detected. The rule for unwrapping may be stated succinctly as follows. Represent the squared (fourth power, etc.) signal as a vector. When the vector crosses the negative real axis in a counter-clockwise direction, increment a counting function by +1 starting the count at zero. When the vector crosses the negative real axis in a clockwise direction, increment the counting function by −1. The unwrapped phase is then the original numerical phase (with jumps) plus $2\pi$ times the counting function. This process is continued until all of the data within one frequency sweep period (or TDMA time slot) is unwrapped, at which point a meaningful root, such as a square root, may be taken. FIG. 8 illustrates an unwrapped version of the phase plot of FIG. 7. As can be seen, the unwrapped phase plot of FIG. 8 is continuous in nature and wanders from approximately 0 radians to around −12 radians, as opposed to being limited to being between plus pi and minus pi radians as is the phase plot of FIG. 7. Of course, any appropriate software can be used to unwrap or eliminate the jumps within the phase of the signal provided to the block 100. Still further, the block 100 can take a fourth complex root, an eighth complex root, etc. by applying a square root procedure two, three, etc. times. In this case, the unwrapping procedure needs only to be performed before the first square root is taken.

As will be understood, the processing performed by the blocks 96, 98, 100, and 102 takes a discrete amount of time. Therefore, the time delay circuit 90 is preferably set to delay the frequency swept signal produced by the multiplier 88 the amount of time it takes to compute the complex conjugate of the estimate of the channel transfer function $\hat{H}*(jw)$ so that a particular frame (or TDMA time slot) of a frequency swept signal is equalized using an equalizing signal developed from that same frame (or TDMA time slot).

Of course, if desired, a signal developed from a previous frame of the frequency swept signal (such as from the previous one or two sweep frames) may be used to develop an equalizing signal so that the time delay circuit 90 can be eliminated or so that the delay time associated therewith can be reduced. Typically, using a channel equalizing signal developed from such an earlier time frame (or time slot) will provide a generally accurate estimate of the channel transfer function because the channel is unlikely to change significantly over the short period of time between adjacent frames (for example, about 312.5 microseconds). In fact, wireless channels typically take from a few milliseconds, in the case of rapid receiver/transmitter motion, to seconds or minutes, in the case of slow receiver/transmitter motion or a stationary transmitter, to change a significant amount because changes to the channel are caused by movement of the mobile unit, movement of reflectors causing the multipath signals, etc.

Alternatively, the channel equalizer 82 can use a training sequence or signal comprising, for example, an unmodulated signal, to develop the equalizing signal. Such a training sequence, which would be known to the mobile unit 50 beforehand, could be periodically transmitted by a base transmitter to indicate the transfer function of the channel in any known manner. However, such a training sequence would take up an entire sweep frame and, therefore, using this technique would reduce the throughput of the channel.

As will be understood, the functions performed by the components illustrated in FIG. 6 may all be implemented in a digital format using, for example, a digital processor under the control of appropriately programmed software. However, the channel equalizer 82 may be implemented in any other desired manner including, for example, using analog circuitry, a hardwired processor, etc. Also, while the present invention has been described with reference to specific examples, which are intended to be illustrative only, and not to be limiting of the invention, it will be apparent to those of ordinary skill in the art that changes, additions, and/or deletions may be made to the disclosed embodiments without departing from the spirit and scope of the invention.

What is claimed is:

1. A demodulator for demodulating a swept frequency signal that has a communication signal modulated by a sweep signal and that has been transmitted through a communication channel, the demodulator comprising:

a receiver that receives the swept frequency signal from the channel;

a blind channel equalizer coupled to the receiver that uses a complex conjugate of the communication channel transfer function estimate to equalize the received swept frequency signal; and a sweep frequency remover coupled to the blind channel equalizer to remove the sweep signal from the equalized swept frequency signal to produce the communication signal.

2. A demodulator for demodulating a swept frequency signal that has a communication signal modulated by a sweep signal and that has been transmitted through a communication channel, the demodulator comprising:

a receiver that receives the swept frequency signal from the channel;

a channel equalizer coupled to the receiver that equalizes the received swept frequency signal; and a sweep frequency remover coupled to the channel equalizer to remove the sweep signal from the equalized swept frequency signal to produce the communication signal;

wherein the swept frequency signal includes a number of tracks, and wherein the channel equalizer includes an isolator that isolates one of the tracks to produce a fixed-frequency track, and a remodulator that remodulates the isolated fixed-frequency track with another sweep signal.

3. The demodulator of claim 1, wherein the communication signal comprises a modulated communication signal and further including a demodulator unit coupled to the sweep frequency remover that demodulates the modulated communication signal.

4. The demodulator of claim 1, wherein the channel equalizer includes an equalizing signal generator that generates an equalizing signal and a combiner that combines the equalizing signal with the swept frequency signal.

5. The demodulator of claim 4, wherein the equalizing signal generator determines the equalizing signal from the swept frequency signal.

6. A demodulator for demodulating a swept frequency signal that has a communication signal modulated by a sweep signal and that has been transmitted through a communication channel, the demodulator comprising:

a receiver that receives the swept frequency signal from the channel;

a channel equalizer coupled to the receiver that equalizes the received swept frequency signal; and a sweep frequency remover coupled to the channel equalizer to remove the sweep signal from the equalized swept frequency signal to produce the communication signal;

wherein the channel equalizer includes an equalizing signal generator that generates an equalizing signal and a combiner that combines the equalizing signal with the swept frequency signal, wherein the equalizing signal generator determines the equalizing signal from the swept frequency signal, and wherein the equalizing signal generator includes a multiplier that multiplies the swept frequency signal with a further sweep signal to produce a fixed-frequency signal, means for removing a modulation from the fixed-frequency signal to produce a channel transfer function estimate for the channel, and means for developing the equalizing signal from the channel transfer function estimate.

7. The demodulator of claim 6, wherein the removing means includes means for squaring the fixed-frequency signal, a filter that filters the squared fixed-frequency signal, and means for square-rooting the filtered squared signal to produce the channel transfer function estimate.

8. The demodulator of claim 6, wherein the removing means includes means for raising the fixed-frequency signal to a power of two to produce a raised signal, a filter that filters the raised signal, and means for taking a root of the filtered raised signal to produce the channel transfer function estimate.

9. The demodulator of claim 8, wherein the root taking means includes means for producing a continuous phase signal having a continuous phase component from the filtered raised signal.

10. The demodulator of claim 6, wherein the developing means includes means for ascertaining the complex conjugate of the channel transfer function estimate to create the equalizing signal.

11. A demodulator for demodulating a swept frequency signal that has a communication signal modulated by a sweep signal and that has been transmitted through a communication channel, the demodulator comprising:

a receiver that receives the swept frequency signal from the channel;

a blind channel equalizer coupled to the receiver that equalizes the received swept frequency signal; and a sweep frequency remover coupled to the blind channel equalizer to remove the sweep signal from the equalized swept frequency signal to produce the communication signal, wherein the swept frequency signal has been transmitted through the channel within one track of a multiplicity of swept frequency tracks and further including a track isolator connected between the receiver and the channel equalizer to isolate the one track from the multiplicity of swept frequency tracks.

12. A demodulator for demodulating a swept frequency signal that has a communication signal modulated by a sweep signal and that has been transmitted through a communication channel, the demodulator comprising:

a receiver that receives the swept frequency signal from the channel;

a channel equalizer coupled to the receiver that equalizes the received swept frequency signal; and a sweep frequency remover coupled to the channel equalizer to remove the sweep signal from the equalized swept frequency signal to produce the communication signal, wherein the swept frequency signal has been transmitted through the channel within one track of a multiplicity of swept frequency tracks and further including a track isolator connected between the receiver and the channel equalizer to isolate the one track from the multiplicity of swept frequency tracks;

wherein the track isolator includes a multiplier that multiplies a further sweep signal with the swept frequency signal to produce a fixed-frequency signal having a fixed-frequency track corresponding to each of the multiplicity of frequency swept tracks and a filter that isolates one of the fixed-frequency tracks.

13. A channel equalizer for use in demodulating a swept frequency signal that has a modulated communication signal modulated with a sweep signal and that has been passed through a channel, the channel equalizer comprising:

means for removing modulation from the swept-frequency signal to produce an estimate of the channel transfer function for the channel;

means for developing a blind equalizing signal from a complex conjugate of the channel transfer function estimate; and means for applying the blind equalizing signal to the swept frequency signal.

14. A channel equalizer for use in demodulating a swept frequency signal that has a modulated communication signal modulated with a sweep signal and that has been passed through a channel, the channel equalizer comprising:

means for removing modulation from the swept-frequency signal to produce an estimate of the channel transfer function for the channel;

means for developing an equalizing signal from the channel transfer function estimate; and means for applying the equalizing signal to the swept frequency signal;

wherein the applying means includes an isolator that isolates a track of the swept frequency signal to produce a fixed-frequency signal, a remodulator for applying another sweep signal back to the fixed-frequency track and means for combining the equalizing signal with the remodulated track signal.

15. A channel equalizer for use in demodulating a swept frequency signal that has a modulated communication signal modulated with a sweep signal and that has been passed through a channel, the channel equalizer comprising:

means for removing modulation from the swept-frequency signal to produce an estimate of the channel transfer function for the channel;

means for developing an equalizing signal from the channel transfer function estimate; and means for applying the equalizing signal to the swept frequency signal;

wherein the removing means includes means for raising the swept-frequency signal to a power of two to produce a raised signal, a filter that filters the raised signal, and means for taking a root of the filtered raised signal to produce the channel transfer function estimate.

16. The channel equalizer of claim 15, wherein the root taking means includes means for producing a continuous phase signal having a continuous phase component from the filtered raised signal.

17. The channel equalizer claim 13, wherein the developing means includes means for ascertaining a complex conjugate of the channel transfer function estimate to create the equalizing signal.

18. A channel equalizer for use in demodulating a swept frequency signal that has a modulated communication signal modulated with a sweep signal and that has been passed through a channel, the channel equalizer comprising:

means for removing modulation from the swept-frequency signal to produce an estimate of the channel transfer function for the channel;

means for developing an equalizing signal from the channel transfer function estimate; and means for applying the equalizing signal to the swept frequency signal;

wherein the applying means includes a delay circuit that delays the swept frequency signal and a convolver that convolves the delayed swept frequency signal with the equalizing signal.

19. A mobile telephone communication system for use in receiving a swept frequency signal having a modulated communication signal component and a sweep signal component, comprising:

an antenna that receives the swept frequency signal from a wireless channel;

a blind channel equalizer coupled to the antenna that uses a complex conjugate of the communication channel transfer function estimate to equalize the received swept frequency signal; and a sweep frequency remover coupled to the blind channel equalizer to remove the sweep signal component from the equalized swept frequency signal to produce the modulated communication signal component; and a demodulator that demodulates the modulated communication signal component to produce a telephony communication signal.

20. The mobile telephone communication system of claim 19, further including a modulated communication signal generator that produces another modulated communication signal, a sweep signal generator, and a multiplier coupled between the sweep signal generator, the modulated communication signal generator and the antenna to produce another swept frequency modulated communication signal.

21. A method of demodulating a swept frequency modulated signal that has been passed through a communication channel comprising the steps of:

receiving the swept frequency modulated signal after the swept frequency modulated signal has passed through the communication channel;

applying a blind channel equalizer that uses a complex conjugate of the communication channel transfer function estimate to the received swept frequency modulated signal; and removing a swept frequency modulation from the equalized swept frequency modulated signal.

22. The method of demodulating a swept frequency modulated signal according to claim 21, wherein the swept modulated signal includes an underlying modulated communication signal modulated with a sweep signal and further including the step of demodulating the underlying modulated communication signal after the step of removing the swept frequency modulation.

23. The method of demodulating a swept frequency modulated signal according to claim 21, wherein the step of applying includes the step of determining the channel equalizer.

24. The method of demodulating a swept frequency modulated signal according to claim 23, wherein the step of determining includes the step of ascertaining the channel equalizer from the received swept frequency modulated signal.

25. A method of demodulating a swept frequency modulated signal that has been passed through a communication channel comprising the steps of:

receiving the swept frequency modulated signal after the swept frequency modulated signal has passed through the communication channel;

applying a channel equalizer to the received swept frequency modulated signal; and removing a swept frequency modulation from the equalized swept frequency modulated signal wherein the step of applying includes the step of determining the channel equalizer, wherein the step of determining includes the step of ascertaining the channel equalizer from the received swept frequency modulated signal, and wherein the step of ascertaining includes the steps of removing a frequency sweep portion from the received swept frequency modulated signal to produce a fixed-frequency signal, raising the fixed-frequency signal to a power of two to produce a raised signal, filtering the raised signal, and taking a root of the filtered raised signal to produce a channel transfer function estimate for the communication channel.

26. The method of demodulating a swept frequency modulated signal according to claim 25, wherein the step of ascertaining further includes the step of determining the complex conjugate of the channel transfer function estimate and providing the complex conjugate of the channel transfer function as the channel equalizer.

27. The demodulator of claim 1, wherein the blind channel equalizer equalizes the received swept frequency signal based on the sweep signal as passed through the channel.

28. The channel equalizer of claim 13, wherein the developing means uses the sweep signal as passed through the channel to develop the blind equalizing signal.

29. The mobile communication system of claim 19, wherein the blind channel equalizer equalizes the received swept frequency signal based on the sweep signal as passed through the channel.

30. The method of claim 21, wherein the step of applying the blind channel equalizer to the received swept frequency signal includes the step of equalizing the received swept frequency signal based on a sweep signal passed through the channel.

* * * * *